Figure 1:
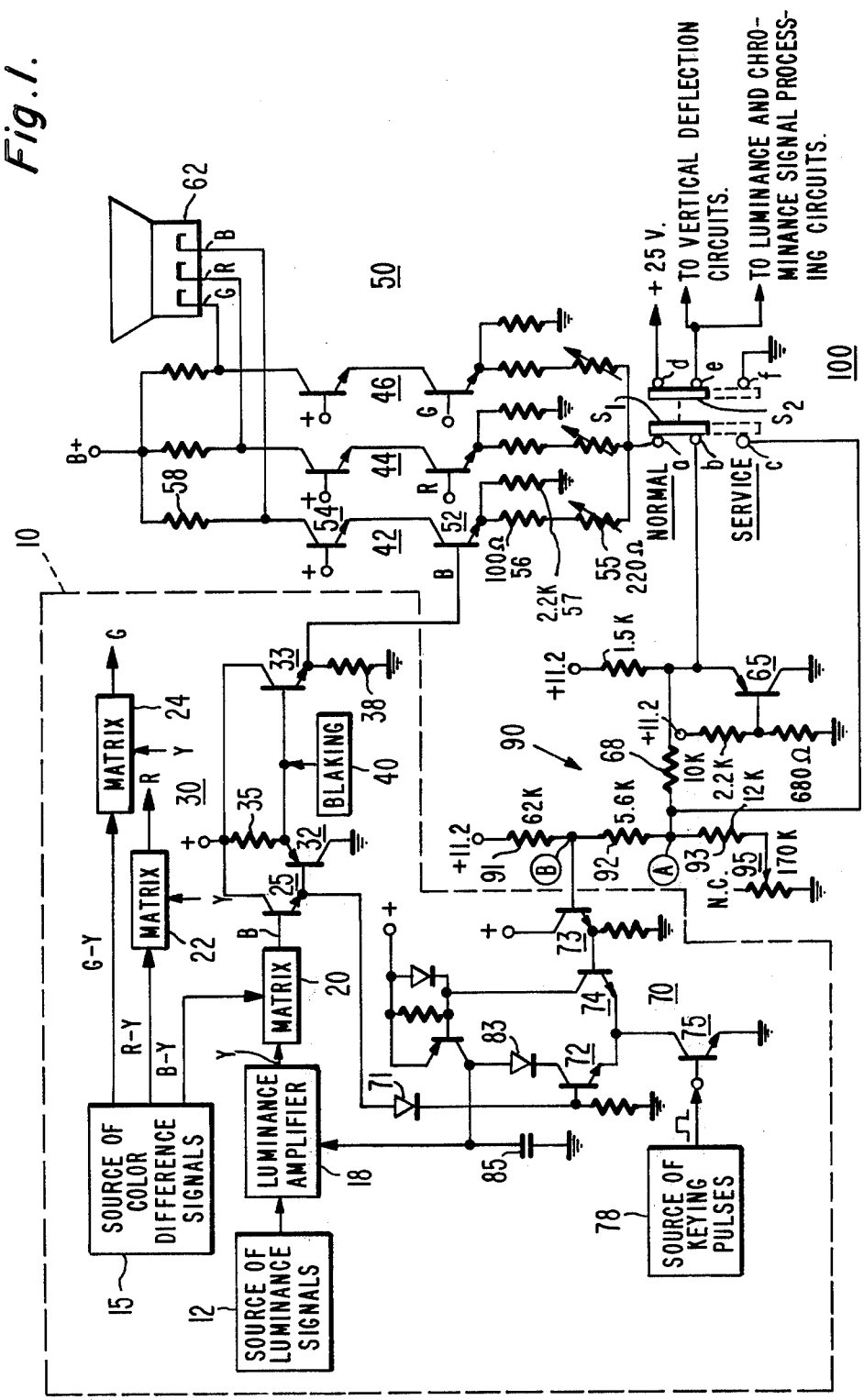

United States Patent [19]

Shanley, II

[11] 4,204,221
[45] May 20, 1980

[54] PREDICTABLY BIASED KINESCOPE DRIVER ARRANGEMENT IN A VIDEO SIGNAL PROCESSING SYSTEM

[75] Inventor: Robert L. Shanley, II, Indianapolis, Ind.

[73] Assignee: RCA Corporation, New York, N.Y.

[21] Appl. No.: 8,171

[22] Filed: Jan. 31, 1979

[51] Int. Cl.$^2$ .............................................. H04N 5/16
[52] U.S. Cl. ...................................... 358/34; 358/168
[58] Field of Search ....................... 358/34, 39, 40, 168

[56] References Cited

U.S. PATENT DOCUMENTS

| | | | |
|---|---|---|---|
| 3,301,943 | 1/1967 | Hansen | 178/5.4 |
| 3,970,895 | 7/1976 | Willis | 315/381 |
| 4,051,521 | 9/1977 | Harwood | 358/30 |
| 4,110,787 | 8/1978 | Parker | 358/34 |

*Primary Examiner*—Robert L. Richardson
*Attorney, Agent, or Firm*—Eugene M. Whitacre; William H. Meagher; Ronald H. Kurdyla

[57] ABSTRACT

A video signal image reproducing system including a video signal processing channel, a kinescope driver for supplying amplified video signals to an image reproducing kinescope, a source of potential to which signals processed by the kinescope driver are referenced, and an adjustable brightness control network which provides a range of brightness reference voltages including a given voltage corresponding to a threshold conduction condition of the kinescope driver. The brightness network is biased from a voltage source from which the signal reference potential is derived. The signal reference potential is coupled to the kinescope driver, and to the brightness network such that the given voltage is produced when the brightness control is at a mid-range setting. A comparator compares a brightness reference voltage from the brightness control with a periodic blanking level of the video signal to provide an output control voltage, which is applied to the video channel for translating the blanking level in a direction to minimize the difference between the compared signals.

13 Claims, 2 Drawing Figures

PREDICTABLY BIASED KINESCOPE DRIVER ARRANGEMENT IN A VIDEO SIGNAL PROCESSING SYSTEM

This invention concerns a color television receiver or equivalent system including an image reproducing kinescope, a kinescope driver network, and a brightness control circuit arranged together to provide predictable biasing of the kinescope driver circuits and kinescope, consistent with predictable operation of the brightness control circuit.

Image brightness information of a composite video signal such as a television signal is defined by the D.C. level of the video signal luminance component. A brightness reference level which approximates a black level of a reproduced image is contained in a blanking level of the luminance component. In order to ensure that a reproduced image will exhibit a proper range of brightness levels in response to video signal information, television receivers commonly include provision for adjusting the kinescope bias to simulate a "black level" condition corresponding to the black level defined by the video signal. Specifically, set-up adjustment of the kinescope in a receiver service mode requires that a reference voltage independent of the video signal be provided to allow adjustment of kinescope conduction to a desired black level. Kinescope set-up adjustment techniques are well known and serve to ensure that the kinescope is properly biased to a threshold conduction condition in response to the blanking reference level of the video signal, or in the absence of signal.

Thus, two reference voltages are typically associated with establishing the desired image black level (and thereby image brightness): the blanking reference level of the video signal, and the reference voltage employed during the service mode to facilitate kinescope bias adjustment. In order to ensure that the reproduced image will exhibit a proper brightness response when the receiver operates normally, it is desirable that the reference voltage used to establish the kinescope blanking level during service adjustment and the video signal blanking reference level produce substantially the same results with respect to reproduced images. However, both of these reference voltages are subject to deviations from an expected value due to component tolerance variations and variations of the operating characteristics of associated circuits due to voltage drift caused by temperature or supply voltage changes, for example.

Although image brightness variations caused by these factors can be compensated for in whole or in part by means of a manually adjustable, viewer operated brightness control, the need to manually readjust image brightness for this purpose represents an inconvenience which should be eliminated. Furthermore, the brightness control circuit may be unable to provide sufficient compensation to produce a normally expected range of brightness control, and may itself exhibit unwanted deviations from normally expected operation due to circuit tolerance variations from receiver to receiver, for example. In the latter regard, it is noted that the center operating point of the brightness control may vary among receivers due to component tolerance variations, thereby producing an unwanted shift or restriction in the brightness control range.

An arrangement in accordance with the present invention for providing predictable kinescope biasing and brightness control is included in a video signal processing system comprising a video signal channel for processing an image representative video signal having periodically recurring image intervals, and blanking intervals disposed between adjacent image intervals and containing a blanking level determinative of image brightness. A video amplifier for coupling video signals from the video channel to an image reproducing kinescope is provided with a reference potential to which signals amplified by the video amplifier are referenced. The video signal reference potential is derived from a bias supply to which an adjustable voltage divider, which provides an adjustable brightness control voltage, is also coupled. The video signal reference potential is also coupled to a point in the adjustable voltage divider. A comparator network with first and second inputs is also included for comparing, during the blanking intervals, signals applied to the comparator inputs to develop an output control signal indicative of the difference in magnitude between the input signals. The first comparator input is supplied with an adjustable brightness control voltage derived from the adjustable voltage divider, and the second comparator input is supplied with the video signals. The comparator output is coupled to the video channel for varying the video signal blanking level in a direction to reduce the difference between the comparator input signals to a minimum.

In accordance with a feature of apparatus according to the invention in a color television receiver including luminance and chrominance signal processing channels, a service switch having "normal" and "service" positions is included. In the service position, the liminance and chrominance channels are rendered inoperative to couple luminance and chrominance signals to the kinescope, and vertical image scanning is disabled, to permit set-up adjustment of the kinescope. Also, the service switch couples the video signal reference potential to a point in the adjustable brightness control voltage divider such that the first comparator input receives a voltage for producing a threshold signal conduction condition of the video amplifier, independent of the setting of the adjustable brightness control.

Figure 2:
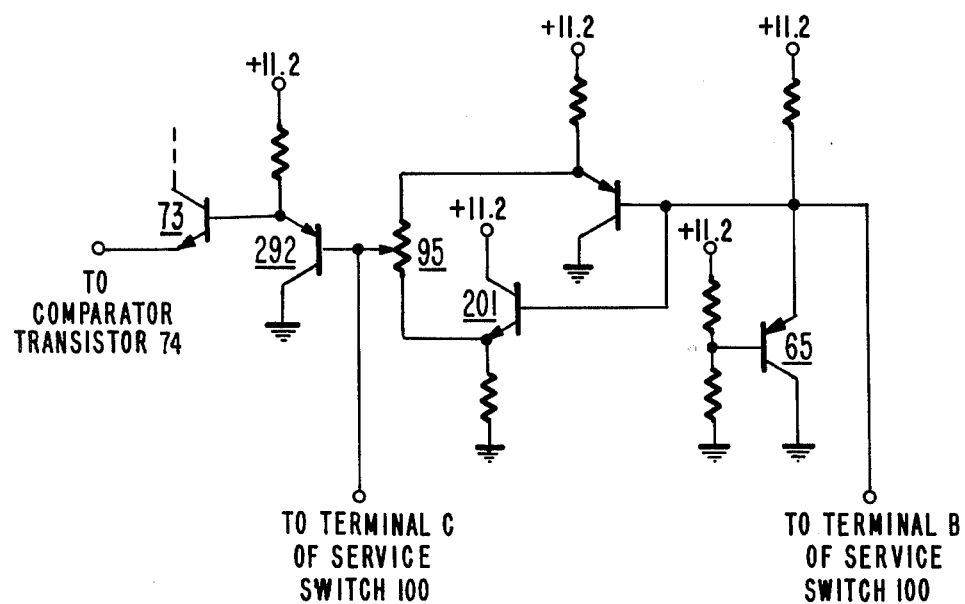

FIG. 1 of the drawing is a diagram partially in block form and partially in schematic diagram form of a portion of a color television receiver employing apparatus in accordance with the present invention; and FIG. 2 depicts an alternate embodiment of a circuit according to the present invention.

In FIG. 1, a block 10 comprises a portion of luminance and chrominance signal processing networks included in a color television receiver. A liminance component of a composite color television signal is supplied from a source 12 included in a luminance channel of the receiver to a luminance amplifier 18 (e.g., a differential amplifier), which amplifies and otherwise processes the luminance component to provide an amplified luminance signal Y. Color difference signals B-Y, R-Y and G-Y are supplied from a source 15 included in a chrominance channel of the receiver to respective matrix networks 20, 22 and 24 where the color difference signals are combined with the amplified luminance signal Y to produce B, R and G color image representative signals. The signals provided by sources 12 and 15 are derived from the composite color television signal in accordance with known techniques and conventional circuits (not shown).

The B, R and G signals are coupled from signal processing block 10 to a kinescope driver 50 including individual driver stages 42, 44 and 46 which respectively supply amplified B', R' and G' signals to intensity control electrodes (i.e., cathodes) of a color kinescope 62. Specifically, the B signal from matrix 20 is D.C. coupled to driver stage 42 via an emitter follower transistor 25, and a "zero offset" buffer stage 30 including opposite conductivity type follower transistors 32, 33 and associated bias resistors 35, 38 all arranged as shown. A source of blanking pulses 40 coupled to a base input of transistor 33 provides negative-going periodic pulses during image blanking (retrace) intervals to inhibit conduction of transistor 33 and to thereby decouple signal B from kinescope driver stage 42 during each image blanking interval.

Driver stage 42 comprises a video amplifier including a low power transistor 52 arranged in cascode video amplifier configuration with an upper-rank, high voltage common base transistor 54 having a collector load resistor 58. The emitter circuit of transistor 52 includes a variable resistor 55 for setting the signal gain of stage 42 during kinescope service adjustment, an associated resistor 56, and a bias resistor 57 returning the emitter of transistor 52 to ground. Signal B is coupled from the emitter output of transistor 33 to the base input of transistor 52 of stage 42, and appears in amplified form (B') across load resistor 58 from which signal B' is D.C. coupled to the blue signal cathode of kinescope 62.

Driver stages 44 and 46 are arranged in the same manner as driver stage 42, and respectively receive the R and G signals from matrix networks 22 and 24 via associated circuits in the same manner as discussed with regard to signal B and driver stage 42, for supplying amplified R' and G' signals to the red and green signal cathodes of kinescope 62.

Kinescope driver 50 also includes a grounded collector PNP transistor 65 with an emitter coupled to the emitter circuit of each lower rank transistor (e.g., transistor 52) of driver stages 42, 44 and 46 via a service switch 100 in a normal operating mode of the receiver. Transistor 65 is biased to provide a predetermined emitter potential of approximately +3.3 volts in this example. This emitter potential represents a reference potential to which the video signals amplified by the driver stages are referenced, and is utilized to establish a desired image black level bias condition in both normal and service receiver operating modes, as will be discussed.

Service switch 100 has a "normal" position, and a "service" position utilized for making kinescope set-up adjustments. The service switch includes two movable conductive members $S_1$ and $S_2$ arranged for common movement, and a plurality of terminals a−f coupled to various portions of the receiver as will be discussed.

Block 10 also includes a high gain, keyed differential comparator circuit 70 including signal sampling transistors 72, 74 arranged in emitter coupled differential amplifier configuration, and a current source transistor 75 for supplying operating currents to transistors 72 and 74. Transistor 75 is keyed to conduct in response to positive, periodic pulses supplied from a source 78 and occurring during the so-called "back porch" interval (i.e., the burst interval) of each horizontal line blanking interval. An average responding filter capacitor 85 coupled to collector output circuit of transistor 72 serves to store (i.e., "hold") charge representative of signal information sampled by comparator 70. Diode 83 in the collector circuit of transistor 72 serves to prevent the normally reverse biased collector-base junction of transistor 72 from becoming forward biased and thereby disrupting the sampling function of comparator 70 in the presence of abnormally large comparator input signals.

The system also contains a brightness control network 90 including a voltage divider network formed by series resistors 91, 92 and 93, a manually adjustable resistor 95 corresponding to a viewer operated brightness control, and an associated source of positive D.C. voltage (+11.2 volts). A point A in the brightness network is coupled to the reference potential developed at the emitter of transistor 65 via a coupling resistor 68, and a point B in the brightness network is coupled via a buffer transistor 73 to the base input of comparator transistor 74. The base voltage of transistor 74 represents a brightness reference voltage which varies according to the setting of adjustable resistor 95.

Comparator 70, luminance amplifier 18, matrix 20 and follower transistor 25 form a closed control loop (i.e., a servo loop) for maintaining a substantially fixed relationship between the brightness reference voltage applied to the base of comparator transistor 74 and the brightness determining blanking level of color signal B from matrix 20. For this purpose, comparator 70 and capacitor 85 are arranged as a "sample and hold" network wherein "sampling" of signal B occurs during the back porch portion of each image blanking interval when transistor 75 is keyed to conduct, and "holding" occurs during the remainder of each horizontal image line cycle. The operation of this closed control loop as well as the associated circuits are described in detail in a copending U.S. patent application of A.V. Tuma, et al., Ser. No. 794,128 entitled "Brightness Control Circuit Employing A Closed Control Loop", and in a copending U.S. patent application of L. A. Harwood, et al., Ser. No. 888,932 entitled "Automatic Brightness Control Circuit Employing A Closed Control Loop Stabilized Against Disruption By Large Amplitude Video Signals".

Briefly, when transistor 75 is keyed "on", comparator 70 compares the brightness reference base voltage of transistor 74 with the voltage then appearing on the base of transistor 72 (corresponding to the brightness representative blanking level of signal B then appearing at the emitter of transistor 25). If an imbalance exists between these base voltages, by differential action comparator 70 causes a control signal to be developed on capacitor 85 of a magnitude and direction to reduce the imbalance toward zero such that the difference between the base voltages of transistors 72 and 74 approaches zero (i.e., zero error). In this regard, it is noted that the burst information has been removed from signal B, so that the sampled portion of signal B includes only the brightness representative blanking level of signal B.

Illustratively, when the blanking level of signal B undesirably drifts to a more positive level corresponding to increased birghtness, the collector current and collector voltage of transistor 72 then increase and decrease, respectively, relative to the collector current and voltage of transistor 74 by virtue of the differential action of comparator 70 during the keying interval. A charge otherwise appearing across capacitor 85 is depleted (discharged) via the collector-emitter current path of transistor 72 in proportion to the level of conduction of transistor 72. This in turn causes the blanking level of luminance signal Y at the output of amplifier 18, and accordingly the blanking level of signal B sensed at the base of transistor 72, to also decrease a corresponding amount. The reduction of the blanking level is in a direction to reduce the potential difference between the base electrodes of comparator transistors 72, 74 toward zero, corresponding to the desired relationship.

In a television receiver it is desirable for the kinescope driver stages to be arranged so that a predictable image black level is produced (i.e., substantially no signal currents flow in the driver stages and the kinescope is biased at a threshold conduction point for a predetermined setting of the brightness control. It is advantageous to produce this result when the brightness control is set at mid-range, which permits symmetrical control of image brightness. Since the center brightness control setting may vary from receiver to receiver due to component tolerance variations for example, the reciever should also include provision to ensure that the center brightness setting is acceptably reproducible from receiver to receiver. The disclosed system accomplishes these results as follows.

Brightness network 90 is arranged so that when brightness control 95 is at mid-range, the brightness reference voltage appearing at point A equals the reference potential developed at the emitter of transistor 65, and no current flows in resistor 68. The base voltage of transistor 74 represents a brightness reference voltage equal to the voltage at point A ($+3.3$ volts) plus the voltage developed across resistor 92 (approximately 0.6 volts), less the base-emitter junction voltage drop of transistor 73 (0.6 volts). In this example, resistor 92 represents an impedance which serves to compensate for the base-emitter junction offset voltage (0.6 volts) of driver transistor 52 by developing a corresponding offset voltage. More specifically, resistor 92 provides a D.C. offset voltage equal to the (single) D.C. voltage offset between the emitter of transistor 25 (the point at which signal B sensed by comparator 70 is derived) and the emitter of driver transistor 52. Diode 71 is included to compensate for the voltage offset caused by the base-emitter junction voltage drop of buffer transistor 73.

During each horizontal blanking interval of the video signal (which includes the sampling interval), pulses from blanking unit 40 serve to inhibit the conduction of transistor 33. Therefore, the video signal is decoupled from driver transistor 52, and no signal induced currents flow through resistors 55 and 56 in the emitter circuit of driver transistor 52. In this example, the point at which current flow in resistors 55 and 56 is inhibited corresponds to a threshold level between kinescope cut-off and conduction, and represents the desired black level condition. This black level condition should also be produced during each horizontal image (trace) interval of the video signal when the video signal equals the blanking level which occurs during the back-porch interval, since this blanking level essentially corresponds to the black level of a reproduced image. The brightness level of a reproduced image will be accurately established when the latter condition is satisfied. The closed control loop including comparator 70, amplifier 18, matrix 20 and transistor 25 assists to accomplish this result in cooperation with brightness network 90 and the reference potential developed at the emitter of transistor 65.

In the normal operating mode of the receiver and when brightness control 95 is centered, the brightness reference voltage ($V_A$) at point A equals the amplifier reference potential ($V_R$) at the emitter of transistor 65. The voltage at the base of comparator transistor 74 also equals this voltage ($V_R$) due to the equal voltage drops associated with resistor 92 and the base-emitter junction of transistor 73. Since the closed control loop maintains the base voltages of comparator transistors 72, 74 substantially equal as discussed previously, the black level of signal B appearing at the base of comparator transistor 72 during the keying interval is caused to equal the brightness voltage ($V_R$) developed at the base of comparator transistor 74. Also, the emitter voltage of transistor 25 then equals the base voltage of transistor 72 plus the voltage drop across diode 71 (i.e., $V_R + 1\ V_{BE}$). Therefore, during image intervals when the video signal level equals the blanking or black level, the emitter voltage of transistor 25 ($V_R + 1\ V_{BE}$) equals the base voltage of driver transistor 52, since the buffer network including transistors 32 and 33 does not produce a D.C. offset voltage. Consequently, the emitter voltage of driver transistor 52 equals the emitter reference potential ($V_R$) of transistor 65, due to the base-emitter junction voltage drop of transistor 52.

The image black level condition described above produces a zero potential difference across resistors 55 and 56 in the emitter circuit of transistor 52 and, consequently, substantially no current flows through these resistors at this time. This result corresponds to the desired zero drive signal condition for proper reproduction of image black levels, and is maintained for each of the B, R and G signals amplified by the respective driver stages due to the action of the closed control loop with respect to luminance signal Y which is matrixed with each of the color difference signals.

The voltage at point A varies above and below the reference potential ($V_R$) as control 95 is adjusted between the extreme upper and lower positions, to thereby vary image brightness in accordance with a viewer's preference. At this time current flows in resistor 68, and the voltage at point A is determined by the voltage divider action of network 90 in combination with the emitter potential ($V_R$) of transistor 65.

It is noted that, with this arrangement, deviations of the emitter reference potential of transistor 65 from a nominal value do not upset the desired image black level condition described above, whereby the image black level is predictably maintained from receiver to receiver for a given setting of the brightness control. More specifically, if the reference potential ($V_R$) shifts due to a shift in the supply voltage ($+11.2$ volts) associated with transistor 65, the brightness reference voltage at the base of comparator transistor 74 will track with this shift, since brightness network 90 is biased from the same supply voltage.

Also with this arrangement, compensation is provided for variations of the center setting of brightness control 95 from receiver to receiver, due to variations in the level of the reference potential at the emitter of transistor 65 caused by circuit tolerances, for example. The amount of compensation which can be provided in this example is approximately sixty-seven percent, and is a function of the Thevenin equivalent impedance ($R_T$) of network 90 in accordance with the expression $$R_T/(R_T + R_{68}) \times 100 = 67\%$$

where $R_{68}$ represents the value of resistor 68, where Thevenin impedance $R_T$ equals the reciprocal of the expression $$1/R_{93}+R_{95})+1/(R_{91}+R_{92})$$

and where the value of $R_{95}$ corresponds to the physical center setting of control 95 (a logarithmic taper device), approximately seventeen kilohms in this instance. With this arrangement, the nominal brightness voltage at the center setting of brightness control 95 is maintained to within sixty-seven percent of the design value notwithstanding variations in the level of the reference potential provided by transistor 65 from receiver to receiver. An even greater degree of compensation, approaching or equaling one hundred percent, is possible with the brightness network shown in FIG. 2.

In FIG. 2, the reference potential ($V_R$) from the emitter of transistor 65 is coupled to brightness control 95 via a coupling network comprising NPN and PNP emitter follower transistors 201 and 202 arranged as shown. Transistors 201 preferably are matched devices. A translated reference potential appearing at the emitter of transistor 201 and at the lower end of brightness control 95 is equal to voltage $V_R$ minus 1 $V_{BE}$ (the base-emitter junction voltage drop of transistor 201), and the potential appearing at the emitter of transistor 202 and the upper end of control 95 is equal to $V_R$ plus 1 $V_{BE}$. When control 95 is set at mid-range, the wiper voltage of control 95 and the base voltage of a transistor 292 equal the reference potential $V_R$. Transistor 292 functionally corresponds to resistor 92 (FIG. 1) for developing a compensating offset voltage as discussed in connection with FIG. 1, such that the desired brightness reference voltage is developed at the base of buffer transistor 73 and at the base of comparator transistor 74 (FIG. 1). With this arrangement, the desired (symmetrical) brightness control range as provided by means of control 95 with respect to a center setting is unaffected by variations of reference potential $V_R$. Also, the desired black level condition corresponding to zero signal current in resistors 55, 56 as discussed in connection with FIG. 1 is maintained.

Thus, the desired kinescope driver black level condition is predictably achieved in the normal receiver operating mode by utilizing only a single reference voltage derived from the kinescope driver network in association with the brightness control network. When block 10 is fabricated in an integrated circuit, only a single external terminal is advantageously required to couple the brightness reference voltage to the input of comparator 70 via the base electrode of transistor 73.

The use of a cascode video amplifier as a kinescope driver stage also assists to establish a proper kinescope threshold conduction level. The relatively low power dissipation levels in the lower devices (e.g., transistor 52) result in relatively stable operation (i.e., low thermal variations in the base-emitter voltage of the lower devices and therefore low variations in the direct output voltages coupled to kinescope 62 as a result of changing signal levels). The relatively high voltage upper rank common base devices (e.g., transistor 54) are current driven from the lower devices which act as a current source, and therefore do not contribute to drift of the output. In this regard, it is noted that kinescope driver 50 may also employ cascode amplifier stages of the type shown in U.S. Pat. No. 4,051,521—Harwood.

In the "service" operating mode of the receiver when it is desired to perform kinescope set-up adjustments, service switch 100 is placed in the "service" position. In this position the reference potential from the emitter of transistor 65 is decoupled from kinescope driver stages 42, 44 and 46, and is instead coupled to point A in brightness network 90 via service switch terminals b and c and conductive switch member $S_1$. Also, the vertical deflection circuits and appropriate control points in the luminance and chrominance signal processing circuits of the receiver are coupled to ground via service switch terminals e, f and conductive switch member $S_2$. By virtue of the latter connections the vertical deflection circuits are disabled such that vertical scanning is collapsed, and luminance and chrominance signals are decoupled from the kinescope, such as in the manner described in my U.S. Pat. No. 4,118,729, for example, or in any other suitable fashion. Appropriate kinescope bias adjustments are then made in a known manner, such as by adjusting the screen grid bias and by adjusting the kinescope drivers for a desired gain (e.g., via resistor 55 for driver stage 42) to assure a proper proportion of red, blue and green signal drive when the receiver operates normally. The latter gain adjustment has no effect on the adjusted kinescope cut-off bias.

The voltage at point A is independent of the setting of brightness control 95, and corresponds to the voltage developed at point A in the normal mode when brightness control 95 is set at mid-range. As already discussed, this normal setting of control 95 produces a condition whereby the base and emitter voltages of driver transistor 52 are such that no current flows in resistors 55 and 56 in the emitter circuit of transistor 52, which is the desired normal threshold black level condition in this case. This condition is also produced in the service mode, when the driver amplifier reference potential from the emitter of transistor 65 is decoupled from driver 50 via the service switch and the base-emitter circuit of transistor 52 is biased in the same manner as when the receiver operates normally and brightness control 95 is centered.

This service arrangement promotes accurate and predictable service adjustment by accurately simulating the black level condition which is desired in the normal mode, and by being substantially insensitive to changes in bias and operating voltages which may occur when the receiver is switched between the normal and service modes. For example, in some receivers, the loading on one or more receiver operating supplies may be affected (i.e., reduced) when the receiver is switched from the normal to service mode due to the vertical scanning being disabled. If these supplies are unregulated or otherwise unable to compensate for this effect, voltages derived from these supplies may change undesirably. In the present system, a change in the +11.2 volt source will not affect the desired black level condition under these circumstances, since the brightness reference voltage derived from network 90 will track with changes in the level of the reference potential at the emitter of transistor 65, as explained previously.

In this example, only the signal B is sampled by comparator 70. The R and G signals can also be sampled in the same manner, although this should not be necessary when the B, R and G signals as applied to the respective inputs of driver stages 42, 44 and 46 closely track with each other (e.g., with respect to temperature, component tolerance and power supply variations). This condition exists, for example, when the circuits providing the B, R and G signals to the kinescope drivers are fabricated on a single integrated circuit. In this connection, it is noted that the networks included within block 10, with the possible exception of capacitor 85, are capable of being fabricated as a single monolithic integrated circuit. Also, the lower rank driver transistors (e.g., transistor 52 of stage 42) are low power devices which can be easily matched with respect to operating characteristics.

Although the invention has been described with reference to particular embodiments, various additional modifications can be made within the scope of the invention.

For example, transistor 65 can be replaced by a zener diode for providing the reference potential, and the compensating impedance represented by resistor 92 could be replaced by a diode coupled and poled for forward current conduction between the emitter of transistor 25 and the base input of comparator transistor 72 (i.e., in series with diode 71). In the latter instance, the base of transistor 73 would be directly connected to resistors 91 and 93 at a common point (i.e., points A and B would then correspond to the same point).

Furthermore, the kinescope threshold conduction level can be tailored by adjusting the level of the emitter reference voltage of transistor 65 (e.g., by automatically varying the base bias of transistor 65 in response to appropriately sensed operating parameters such as the operating supply (B+) of kinescope driver 50 or the screen grid bias potential of kinescope 62). The base electrode of transistor 65 also can be supplied with A.C. signals representative of (monochrome) information such as graphics and test material to be displayed by kinescope 62.

What is claimed is:

1. In a video signal processing system including a video signal channel for processing an image representative video signal having periodically recurring image intervals, and blanking intervals disposed between adjacent image intervals and containing a blanking level determinative of image brightness; bias supply means; a kinescope for reproducing images in response to video signals applied thereto; and kinescope driver means for coupling video signals from said channel to said kinescope; apparatus comprising:

comparator means having first and second inputs for comparing, during said blanking intervals, signals applied to said inputs to provide an output control signal indicative of the difference in magnitude between the input signals;

means for deriving a reference potential from said bias supply means;

means for coupling said reference potential to said kinescope driver means for providing a reference potential to which video signals amplified by said kinescope driver means are referenced;

adjustable voltage divider means coupled to said bias supply means, for providing an adjustable brightness control voltage;

means for coupling an adjustable brightness control voltage derived from said adjustable voltage divider means to said first input of said comparator means;

means for coupling video signals from said channel to said second input of said comparator means;

means for coupling said output of said comparator means to said channel, for varying said blanking level in a direction to reduce said difference to a minimum; and wherein said reference potential to which signals amplified by said driver means are referenced is coupled to a point in said adjustable voltage divider means.

2. Apparatus according to claim 1, wherein:
said second input of said comparator means is coupled to said video channel at a first point for sensing said blanking level; and
said control signal is coupled to a second point in said video channel prior to said first point to form a closed loop with said video channel.

3. Apparatus according to claim 2, wherein:
said kinescope driver means comprises an active current conducting device having an input terminal coupled to said video channel after said first point for receiving video signals processed by said channel, an output terminal coupled to said kinescope, and a common terminal, said output and common terminals defining a main current conduction path for said active device; and wherein
an impedance network couples said common terminal to said reference potential.

4. Apparatus according to claim 3, wherein:
said voltage divider means is adjustable to produce a range of brightness determinative voltages at said first comparator input, said range including a voltage for producing substantially no current flow in said impedance network of said kinescope driver;
an impedance is coupled between said reference potential and a point in said adjustable voltage divider means; and wherein
the circuit parameters of said adjustable voltage divider means and impedance are arranged so that said voltage for producing substantially no current flow in said impedance network of said kinescope driver is developed at a mid-range setting of said adjustable voltage divider means.

5. Apparatus according to claim 4 and further comprising:
means coupled to an input of said comparator means to compensate for voltage offsets between said point in said video channel to which said second comparator input is coupled and said common terminal of said kinescope driver device.

6. Apparatus according to claim 5, wherein:
said compensating means provides an offset voltage such that the potential developed at said common terminal of said kinescope driver device substantially equals said reference potential when the difference between said comparator inputs is a minimum and when said adjustable resistance is adjusted to said mid-range setting, whereby substantially no current then flows through said impedance network of said kinescope driver.

7. Apparatus according to claim 5, wherein:
said kinescope driver device comprises a transistor having a base input terminal, a collector output terminal and a common emitter terminal; and said compensating means comprises a resistance.

8. Apparatus according to claim 7, wherein:
said comparator means comprises first and second transistors arranged in differential amplifier configuration; and
a charge storage device is coupled to an output electrode of one of said differential amplifier transistors for developing said control signal in response to the conduction of said first and second transistors during said blanking intervals.

9. In a color television receiver including a video signal transmission path for processing a color image representative video signal, said transmission path including a luminance channel for processing a luminance component of said video signal having periodically recurring image intervals and image blanking intervals disposed between adjacent image intervals and containing a blanking level determinative of image brightness, and a chrominance channel for processing a chrominance component of said video signal; bias supply means; means for combining signals processed by said luminance and chrominance channels; a kinescope for reproducing images in response to video signals applied thereto; and kinescope driver means for coupling combined video signals from said combining means to said kinescope; apparatus comprising:
- a source of keying signals coincident with a portion of said blanking interval containing said blanking level;
- comparator means responsive to said keying signals and having first and second inputs for comparing, during said portion of said blanking intervals, signals applied to said inputs to provide an output control signal indicative of the difference in magnitude between said input signals;
- means for deriving a reference potential from said bias supply means;
- means for coupling said reference potential to said kinescope driver means for providing a reference potential to which signals amplified by said kinescope driver means are referenced;
- adjustable voltage divider means coupled to said bias supply means, for providing an adjustable brightness control voltage;
- means for coupling an adjustable brightness control voltage derived from said adjustable voltage divider means to said first comparator input;
- means for coupling output signals from said combining means to said second comparator input;
- means for coupling said output of said comparator means to said video signal transmission path, for varying said blanking level in a direction to reduce said difference to a minimum; and wherein
- said reference potential to which signals amplified by said driver means are referenced is coupled to a point in said adjustable voltage divider means.

10. Apparatus according to claim 9, wherein:
said second input of said comparator means is coupled from said output of said combining means at a first point in said signal transmission path for sensing said blanking level; and
said control signal is coupled to a second point in said signal transmission path prior to said first point to form a closed loop with said signal transmission path.

11. Apparatus according to claim 10, wherein:
said control signal is coupled to said luminance channel.

12. Apparatus according to claim 10, wherein:
said chrominance channel includes means for deriving color difference signals; and
said combining means combines said color difference signals and said luminance component to produce color image representative output video signals.

13. Apparatus according to claim 9, including switch means having a first position for selectively rendering said luminance and chrominance channels normally operative in a normal operating mode of said receiver and for coupling said reference potential to said kinescope driver means, and a second position for selectively rendering said luminance and chrominance channels inoperative to couple said luminance and chrominance components, for disabling vertical scanning of said kinescope and for decoupling said reference potential from said kinescope driver means in a service operating mode of said receiver, wherein:
said voltage divider means is ajustable to produce a range of brightness determinative control voltages at said first comparator input, including a voltage for producing a threshold signal conduction condition for said kinescope driver when said signal difference is a minimum;
an impedance is coupled between said reference potential and a point in said adjustable voltage divider means, the circuit parameters of said adjustable voltage divider means and said impedance being such that said voltage for producing said threshold signal conduction condition is developed at a midrange setting of said adjustable voltage divider means; and wherein
said switch means in said second position couples said reference potential to a point in said adjustable voltage divider means such that said first comparator input receives said voltage for producing said threshold signal conduction condition, independent of the setting of said adjustable voltage divider means.

* * * * *